(12) United States Patent
Endo et al.

(10) Patent No.: US 6,780,901 B1
(45) Date of Patent: Aug. 24, 2004

(54) INK, INK-JET RECORDING METHOD, INK-JET RECORDING APPARATUS, AND COLORING MATERIAL

(75) Inventors: Makiko Endo, Tokyo (JP); Yutaka Kurabayashi, Murayama (JP); Hiroyuki Takuhara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/669,899

(22) Filed: Sep. 27, 2000

(30) Foreign Application Priority Data

Sep. 30, 1999 (JP) .......................... 11-280396
Sep. 30, 1999 (JP) .......................... 11-280397

(51) Int. Cl.⁷ .................... C09D 11/10; C08K 9/00
(52) U.S. Cl. ........................ 523/160; 523/205
(58) Field of Search ........................ 523/160, 161, 523/201, 205; 106/31.57, 31.28, 31.6, 31.27

(56) References Cited

U.S. PATENT DOCUMENTS

| | | | |
|---|---|---|---|
| 4,294,902 A | * 10/1981 | Takashima et al. | 430/45 |
| 4,623,689 A | 11/1986 | Shintani et al. | 524/457 |
| 4,665,107 A | * 5/1987 | Micale | 523/105 |
| 4,692,188 A | 9/1987 | Ober et al. | 106/23 |
| 5,114,479 A | * 5/1992 | Keaveney et al. | 524/556 |
| 5,700,851 A | * 12/1997 | Banning et al. | 523/181 |
| 5,827,911 A | * 10/1998 | Hayashi et al. | 524/89 |
| 5,965,634 A | 10/1999 | Idogawa et al. | 523/161 |
| 5,973,062 A | * 10/1999 | Harris et al. | 524/590 |
| 5,985,988 A | * 11/1999 | Hodge | 524/604 |
| 6,034,154 A | 3/2000 | Kase et al. | 523/161 |
| 6,274,728 B1 | * 8/2001 | Hall-Goulle et al. | 540/130 |

FOREIGN PATENT DOCUMENTS

| | | |
|---|---|---|
| EP | 0 130 789 A1 | 1/1985 |
| EP | 0 732 381 A1 | 9/1996 |
| EP | 0 867 484 | 9/1998 |
| JP | 55139471 A | * 10/1980 |
| JP | 55-139471 | 10/1980 |
| JP | 62-95366 | 5/1987 |
| JP | 5-255567 | 10/1993 |
| JP | 10-140057 | 5/1998 |
| JP | 11-29732 | 2/1999 |
| JP | 11228655 | * 8/1999 |

OTHER PUBLICATIONS

English Translation of JP 55139471 (1979).*
Patent Abstracts of Japan, vol. 1998, No. 11, with respect to JP 10–176130 A of Sep. 30, 1998.

* cited by examiner

*Primary Examiner*—Callie Shosho
(74) *Attorney, Agent, or Firm*—Fitzpatrick, Cella, Harper & Scinto

(57) ABSTRACT

An ink is provided which is capable of forming a recorded image with improved water resistance and improved ozone resistance of recorded images which are not achievable by conventional aqueous inks employing a water-soluble dye as the coloring agent, and also capable of forming images having improved fixability, improved color developability, and improved ozone resistance which are not achievable by conventional dispersion type inks employing a pigment as the coloring agent. The ink is useful widely for recording like ink-jet recording, and gives recorded images having high rub resistance and high ozone resistance and being excellent in color development and image transparency. The aqueous ink comprises a colored resin dispersed therein, and the colored resin is composed of a film-forming resin and a colorant dispersed in a monomolecular state in the film-forming resin.

1 Claim, 2 Drawing Sheets

INK, INK-JET RECORDING METHOD, INK-JET RECORDING APPARATUS, AND COLORING MATERIAL

BACKGROUND OF THE INVENTION

1. Field of the Invention

The present invention relates to an aqueous ink, particularly to an aqueous ink suitable for ink-jet recording. The present invention relates also to an ink-jet recording method, an ink-jet recording apparatus, an ink cartridge, a recording unit, and a coloring material.

2. Related Background Art

Various types of printers are known as image-forming apparatuses, including thermal transfer printers, laser beam printers, dot impact printers, and ink-jet printers. Of these printers, the ink-jet printer is constructed so as to eject ink droplets toward a recording medium like a paper sheet and deposit the droplets thereon. The ink-jet recording system is attracting attention in recent years owing to its capability to form a full color image with high image quality at a low cost. The ink-jet recording method includes thermal ejection methods utilizing bubbling of a liquid upon heating for ink ejection, and piezo ejection methods employing a piezo element.

In the ink-jet recording, usually an aqueous ink is used as the ink. The aqueous ink usually contains as a colorant an aqueous dye such as, for example, acid dyes, direct dyes, and basic dyes. Hence, the ink-jet recording may give rise to such a problem that the recorded images are not satisfactory in their water resistance and ozone resistance disadvantageously.

On the other hand, the ink prepared by dispersing a pigment in an aqueous medium forms images with higher image fastness or durability such as water resistance and light fastness than the aqueous ink employing a water-soluble dye as the colorant. However, the pigment dispersion ink is generally inferior in color of the images such as an optical density and chroma of the images, to the aqueous ink. Further, the image printed with such a pigment dispersion ink is not sufficient in fixation to the recording medium surface, so that the paper face may be soiled with the pigment when the images are rubbed with a finger and the image areas may be blurred when they are marked with a marking felt-tip pen. Hence, the images are not sufficient in the rub resistance and marking resistance.

To solve the above problem, various techniques for improvement of the water resistance and fixability of recording images are proposed, such as incorporation of a resin in the ink, and use of a dye-colored resin as the coloring agent. Japanese Patent Application Laid-Open No. 10-140057 discloses the incorporation of a film-forming resin and non-film-forming resin in the ink to improve the fixability and ink ejection stability. Japanese Patent Application Laid-Open No. 11-29732 discloses the incorporation of fine particulate film-forming polymer in the ink to obtain images having high rub resistance and high water resistance.

SUMMARY OF THE INVENTION

The inventors of the present invention have investigated the above prior art techniques. An ink containing a colorant 2001 and a particulate resin 2003 dispersed separately as shown in FIG. 2A does not improve sufficiently the ozone resistance and the water resistance of the formed images. This is because, on application of the ink on a recording medium 2005, the colorant 2001 is distributed among the particulate resin 2003 on the surface of the recording medium 2005 as shown in FIG. 2B, thereby preventing approach of the resin particles to retard the formation of a film on the recording medium, and leaving the colorant remaining on the recording medium surface without sufficient incorporation of the colorant into the film.

Japanese Patent Application Laid-Open No. 5-255567 discloses use of an aqueous dispersion of a coloring resin to enhance the water resistance and rub resistance of the images. Japanese Patent Application Laid-Open No. 55-139471 discloses an ink which employs colored particles prepared by dispersing a dye in an aqueous medium containing a vinyl resin latex dispersed therein and further dispersing the dye in the resin particle, for example, by heat treatment. Japanese Patent Application Laid-Open No. 62-95366 discloses that an ink is prepared by dissolving a polymer and an oil dye in a water-insoluble organic solvent, emulsifying the resulting solution to obtain polymer particles containing the dye therein and then incorporating the polymer particles in the ink. As a result of the studies by the inventors of these techniques, the formed images are found to be deteriorated in terms of the color tone and transparency or clarity although the rub resistance and the ozone resistance thereof are improved.

An object of the present invention is to provide an ink which is able to form recorded images having improved water resistance and improved ozone resistance that are not achievable by the conventional aqueous inks employing a water-soluble dye as the coloring agent and which is able to provide recorded images with improved fixability, improved color developability and improved ozone resistance that are not achievable by the conventional dispersion type inks employing a pigment as the coloring agent; in particular, to provide an ink which can be widely used as a recording liquid for recording apparatus like ink-jet recording and give recorded images having satisfactory rub resistance and ozone resistance and being excellent in color development and image transparency.

Another object of the present invention is to provide an ink-jet recording method which gives ink-jet images having high rub resistance and ozone resistance, and high color developability and high transparency, which are not simultaneously achievable by the conventional recording method.

Still another object of the present invention is to provide an ink-jet recording apparatus and ink-jet recording unit which are able to give ink-jet recorded images with excellent rub resistance and ozone resistance and with satisfactory color developability and high image transparency.

A further object of the present invention is to provide an ink cartridge which can be used for forming recorded images with satisfactory rub resistance and ozone resistance and with excellent color developability and image transparency.

A still further object of the present invention is to provide a coloring material which can be used for forming recorded images with satisfactory rub resistance and ozone resistance and with excellent color developability and image transparency.

The inventors of the present invention have investigated the reason for the lowered color developability and the lowered transparency or clarity of the images which are formed with the conventional ink containing a coloring resin composed of a colored film-forming resin for improvement of the rub resistance. According to the investigation, the colorant 3001 is in a state of aggregation in the resin particle 3003 in the ink as shown in FIG. 3A. When the ink is applied onto a recording medium 3007, the resin 3003 forms a film 3005, and the aggregated colorant particles 3001 are localized in the resin film 3005 as shown in FIGS. 3B and 3C. It thus has turned out that the light scattering is caused by the colorant particles and the color tint of the colorant is changed by the absorption wavelength shift due to the aggregation of the colorant, and as a result, the color developability and the image transparency are lowered. The present invention is based on the such finding.

According to one aspect of the present invention, there is provided an aqueous ink comprising a colored resin dispersed therein, the colored resin comprising a film-forming resin and a colorant dispersed in a monomolecular state in the film-forming resin.

According to another aspect of the present invention, there is provided an ink-jet recording method comprising a step of ejecting an aqueous ink comprising a colored resin dispersed therein through an orifice in correspondence with a recording signal to deposit the ejected ink onto a recording medium, the colored resin comprising a film-forming resin and a colorant dispersed in a monomolecular state in the film-forming resin.

According to still another aspect of the present invention, there is provided an ink cartridge comprising an ink container containing the above-mentioned ink.

According to further aspect of the present invention, there is provided a recording unit comprising an ink container containing an aqueous ink, and a head for ejecting the ink through an orifice in correspondence with a recording signal, the aqueous ink comprising a colored resin dispersed therein, and the coloring resin comprising a film-forming resin and a colorant dispersed in a monomolecular state in the film-forming resin.

According to still further aspect of the present invention, there is provided a coloring material comprising colored resin particles comprising a film-forming resin and a colorant dispersed in a monomolecular state in the film-forming resin.

BRIEF DESCRIPTION OF THE DRAWINGS

FIGS. 1A, 1B and 1C are drawings for explaining the mechanism of color development with the ink of the present invention; wherein FIG. 1A shows that colored resin particles containing a colorant dispersed therein are dispersed in the ink, and including enlarged views of the colored particles; FIG. 1D shows ink droplets are applied onto a recording medium; and FIG. 1C shows a resin film in which the colorant is dispersed, formed on the recording medium.

FIGS. 2A and 2B are drawings for explaining the mechanism of color development with the conventional ink; wherein FIG. 2A shows that colorant particles and resin particles are dispersed in an ink; and FIG. 2B shows the colorant particles are dispersed among the resin particles on a recording medium.

FIGS. 3A, 3B and 3C are drawings for explaining the mechanism of color development with another conventional ink; wherein FIG. 3A shows that a colorant is in a resin particle; FIG. 3B shows that the ink is applied onto a recording medium; and FIG. 3C shows a resin film formed on the recording medium.

DETAILED DESCRIPTION OF THE PREFERRED EMBODIMENTS

The present invention is described below in more detail by reference to preferred embodiments.

The present invention provides an aqueous ink comprising a colored resin dispersed therein. The colored resin comprises a film-forming resin, and a colorant dispersed in a monomolecular state in the film-forming resin.

Figure 1A:
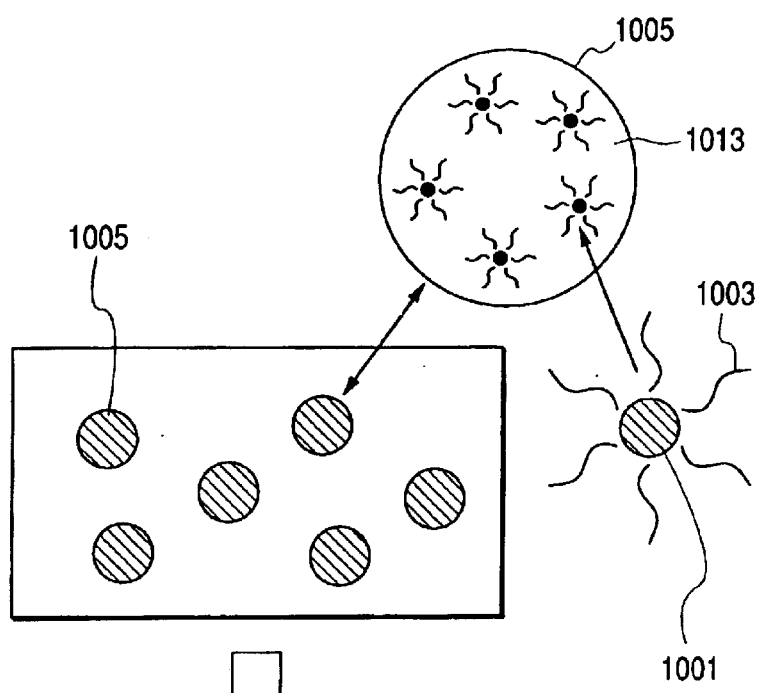
Figure 1B:
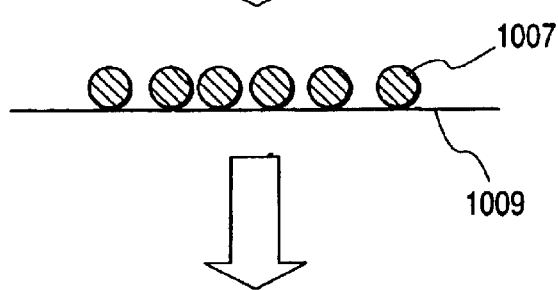
Figure 1C:
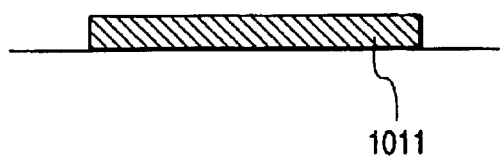
Figure 2A:
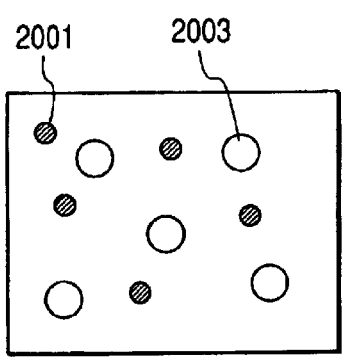
Figure 2A:
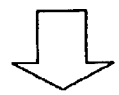
Figure 2B:
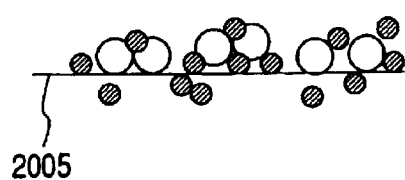
Figure 3A:
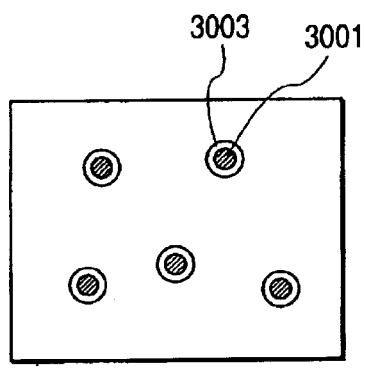
Figure 3A:
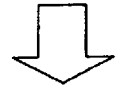
Figure 3B:
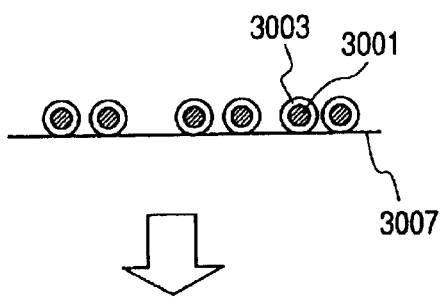
Figure 3C:
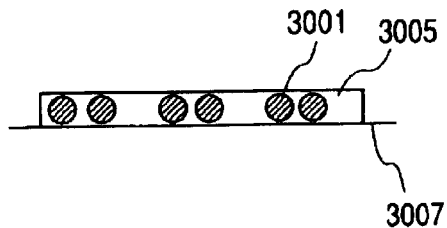

After comprehensive investigation to solve the problems of the aforementioned prior art technique, the inventors of the present invention have found that as shown in FIG. 1C, a resin film 1011 in which a colorant is well distributed in a delocalized fashion in a monomolecular state can be obtained by employing an ink comprising a colored resin 1005 dispersed therein, the colored resin 1005 comprising a film-forming resin 1013 and a colorant 1001 which is incorporated in the interior of the film-forming resin 1013 in a monomolecular state as shown in FIG. 1A, and applying the ink in the form of droplets 1007 onto a recording medium 1009 as shown in FIG. 1B. For the film-forming resin, a resin capable of forming a film at a relatively low temperature, for example, a resin having a minimum film-forming temperature (MFT) of 35° C. or below, is preferably employed. With the ink of such a type as mentioned above, images are formed in which a change in the tint inherent in the colorant attributable to aggregation of the colorant is suppressed and the light scattering due to the aggregated colorant is restrained. As a result, images are provided which have satisfactory fixing property, and excellent color, i.e. optical density, chroma etc. and high transparency, and moreover, images showing improved ozone resistance are obtained. The present invention is hence achieved.

The film-forming resin used for the ink may have a minimum film-forming temperature (MFT) of preferably 35° C. or lower, more preferably 25° C. or lower, and still more preferably 10° C. or lower. This is because it is preferable from the viewpoint of achieving the object of the present invention that in printing on a recording medium like paper, only the solvent in the ink should preferably be allowed to penetrate into the recording medium, while the resin should preferably be made to remain on or in the vicinity of the surface of the recording medium and particles of the resin are melt-adhered together, thereby forming a resin film quickly. In other words, the resin having the aforementioned MFT enables the quick formation of the resin film in the environment in which the ink is used.

The colored resin should preferably be such one that has properties as mentioned above and contains a colorant in a monomolecular state.

The colored resin contains the colorant in a monomolecular state in such a condition that the colorant is incorporated into the steric configuration of the resin molecules, namely into the network structure of the resin, and more specifically the colorant is present in a monomolecular state not only in the interior portion of the resin, but also throughout the entire resin.

Such a colored resin may be formed by use of a colorant and a resin which are compatible with each other. On application of such an ink containing the colored resin in a dispersed state therein on a recording medium, the resin forms a film 1011 on the recording medium owing to its film-forming property as shown in FIGS. 1A, 1B and 1C. In the film formation, the colorant is dispersed uniformly in a monomolecular state throughout the resin film 1011 without causing local aggregation of the colorant on the recording medium. As a result, light scattering in areas where the resin film is formed on the recording medium is prevented, thereby images with excellent transparency is obtained. In addition, as shown in FIG. 1B, the colorant is kept remaining on or near the surface of the recording medium together with the resin and does not penetrate into the interior of the recording medium. Furthermore, color tone inherently possessed by the colorant is not impaired owing to the monomolecular state of the colorant in the film. Due to these factors, the present invention enables the formation of images excellent not only in rub resistance and ozone resistance, but also in color developability.

The resin used in the present invention containing a colorant therein in the monomolecular state can be produced, for example, by adding a dye to a fine particulate resin dispersion, and heating with agitation for a certain period of time to allow the dye to sublime and penetrate into the resin particles; or by swelling a fine particulate resin with an organic solvent, and allowing a dye to penetrate into the resin particles.

In the above method, a colorant 1001 or a colorant dissolved in an organic solvent may stably be dispersed in a resin particle 1005 by use of a dispersion stabilizer 1003 such as a solubilizing agent as shown in FIG. 1A. As described above, the resin is colored by use of a solubilizing agent such as surfactants having a dispersion stabilizing action. More precisely, the colored resin may be prepared by dispersing or dissolving a solubilizing agent and a slightly water-soluble dye or pigment in a resin solution, optionally heating the solution, to introduce the colorant to the resin particles to conduct the coloration of the resin and treating the solution for phase reversal emulsification. However, the coloration of the resin is not limited to this method.

The resin useful in the present invention includes, for example, homopolymers and copolymers of two or more monomers, such as acrylic resins, acryl-styrene copolymer resins, styrene resins, vinyl acetate resins, vinyl acetate-acryl copolymer resins, acryl-silicone resins, fluoro-resins, polyester resins, vinyl chloride resins, styrene-butadiene copolymer resins, polyurethane resins, vinyl acetate-ethylene copolymer resins, epoxy resins, polyamide resins, and silicone resins. These resins are commercially available in a form of an aqueous dispersion, and may be used as they stand without additional treatment. Otherwise, the monomer of the above resins may be polymerized by emulsion polymerization or another conventional method to obtain a particulate film-forming resin. For example, a known mechanical or interfacial-chemical dispersion method may be employed. More specifically, a method may be used in which a resin solution is mechanically emulsified in the presence of an emulsifying agent such as a surfactant by a high-speed mixer like a homogenizer and the solvent is removed. Another method may be employed in which the resin is directly micro-pulverized and finely dispersed by a pulverizer such as a jet mill, a freezer mill, a ball mill, and a sand mill. In a still another method, when a self-emulsifiable resin is used, it may be converted by phase reversal emulsification into the resin particles. In this case, the monomer is polymerized, the resulting resin is dissolved in an organic solvent, the solution is dispersed in water by addition of an aqueous medium in the presence of a base, and if necessary the organic solvent is removed, for example by azeotropic distillation to obtain water-dispersible resin particles. For the dispersion in water, an emulsifier or a like additive may be added optionally.

Of the aforementioned film-forming resin, particularly preferred are self-crosslinkable ones. An example of the self-crosslinkable resin is an acrylic resin. The self-crosslinkable resin is capable of forming a film at a high speed, and is suitable for high-speed image formation. The monomer for forming the acrylic skeleton includes, for example, styrene, methacrylic acid, ethyl methacrylate, n-butyl methacrylate, isobutyl methacrylate, 2-ethylhexyl methacrylate, vinyl acetate, acrylonitrile, acrylic acid, methyl acrylate, ethyl acrylate, n-butyl acrylate, 2-ethylhexyl acrylate, and acrylamide. These monomer may used singly or in combination of two or more thereof.

Further in the present invention, of the aforementioned resins, preferred is a resin which has a minimum film-forming temperature (MFT) of not higher than 35° C. Generally, a resin constituted of a homopolymer has its glass transition temperature (Tg) inherent to the polymer. However, as to a resin constituted of a copolymer obtained by copolymerization of different monomers, its Tg can be controlled at a some degree of freedom by adjusting the polymerization ratio of the monomers. Moreover, the Tg of copolymers can be lowered by increasing the number of a pendant group or lengthening the flexible side chain, and can be raised by increasing the number of an α-substituent group or a polar group, or increasing the crosslinking density. Generally speaking, the MFT can be raised or lowered in connection with the change of the Tg. The MFT of the resin used in the present invention may be controlled to be at the optimum temperature by adjusting the Tg of the resin in the manner as described above.

In the preparation of the water-dispersible colored resin particles of this embodiment using the phase reversal emulsification, the organic solvent to be used includes, for example, ketones such as acetone, dimethyl ketone, and methyl ethyl ketone; alcohols such as methanol, ethanol, and isopropanol; ethers such as tetrahydrofuran, and dioxane; halogenated hydrocarbons such as carbon tetrachloride, chloroform, dichloromethane, and dichloroethane; aromatic hydrocarbons such as benzene, toluene, and xylene; esters such as ethyl acetate, and butyl acetate; glycol ethers such as ethylene glycol monomethyl ether, ethylene glycol dimethyl ether; and amides. Any solvent may be used, provided that it is capable of dissolving the resin and the dye.

The base includes, for example, alkali metal hydroxides such as lithium hydroxide, potassium hydroxide, and sodium hydroxide; basic substances such as ammonia, and triethylamine; and alkanolamines such as triethanolamine, diethanolamine, N-methyldiethanolamine. In particular, the alkanolamine may produce colored resin particles having excellent dispersion stability in the ink and additionally may serve as a moisturizing agent to yield advantageous effects.

The solubilizer for dispersing stably a slightly water-soluble dye or pigment in the resin includes, for example, surfactants, low molecular dispersants, polymeric dispersants having a hydrophilic group and a hydrophobic group. They may be used singly or in combination of two or more thereof. The solubilizer is not limited thereto.

The water dispersible colored resin particles for the ink of the present invention may optionally contain an additive like an ultraviolet absorbing agent, or the like dissolved therein, in addition to the dye or pigment.

The colorant for the ink is not limited provided that it is compatible with the combinedly used resin, including dyes such as acid dyes, basic dyes, direct dyes, oil-soluble dyes, disperse dyes, and vat dyes; and pigments. Of these, oil-soluble dyes and disperse dyes are preferred in view of the ease of incorporation in a monomolecular state into the resin interior. Typically, the dye includes, for example, anthraquinone dyes, azo dyes, disazo dyes, phthalocyanine dyes, naphthol dyes, benzoquinone dyes, indigo dyes, methine dyes, nitro dyes, quinophthalone dyes, quinoline dyes, cyanomethine dyes, triphenylmethane dyes, and xanthene dyes.

Specifically the oil-soluble dye includes, for example, C.I. Solvent Yellows 1, 2, 3, 13, 19, 22, 29, 36, 37, 38, 39, 40, 43, 44, 45, 47, 62, 63, 71, 76, 81, 85, 86, 96, and 162; C.I. Solvent Reds 8, 27, 35, 36, 37, 38, 39, 40, 49, 58,. 60, 65, 69, 81, 86, 89, 91, 92, 97, 99, 100, 109, 118, 119, and 122; C.I. Solvent Blues 14, 24, 25, 26, 34, 35, 37, 38, 39, 42, 43, 45, 48, 52, 53, 55, 59, 64, 67, 70, and 105; and C.I. Solvent Black 3. The disperse dye includes, for example, C.I. Disperse Yellows 5, 33, 42, 54, 64, 79, 82, 83, 93, 99, 100, 119, 122, 124, 126, 160, 184, 186, 198, 199, 204, 88, 91, 92, 93, 111, 126, 127, 134, 135, 143, 145, 152, 153, 154, 159, 164, 167, 177, 181, 204, 206, 207, 221, 239, 240, 258, 277, 278, 283, 311, 323, 343, 348, 356, and 362; C.I. Disperse Violets 26, 35, and 38; and C.I. Disperse Blues 56, 60, 73, 87, 113, 128, 143, 148, 154, 158, 165, 176, 183, 185, 197, 198, 201, 214, 224, 225, 257, 266, 267, 287, 354, 358, 365, and 368. These dyes may be used singly or in combination of two or more thereof.

The pigment useful as the colorant for the colored resin includes the inorganic and organic pigment mentioned below. The inorganic pigment includes, for example, carbon blacks such as furnace black, and channel black; and C.I. Pigment Black 7. The organic pigments includes, for example, azo pigments such as azo lake, insoluble azo pigments, condensed azo pigments, and chelate azo pigments; polycyclic pigments such as phthalocyanine pigments, perylene pigments, anthraquinone pigments, quinacridone pigments, and dioxazine pigments; nitro pigments; nitroso pigments; and aniline black. Specifically, the organic pigment includes, for example, C.I. Pigment Black 1; C.I. Pigment Yellows 1, 3, 12, 13, 14, 17, 24, 35, 37, 42, 55, 83, 95, 97, 100, 101, 108, 110, 117, 120, and 153; C.I. Pigment Reds 5, 7, 12, 48, 57, 112, 123, 168, and 184; C.I. Pigment Violets 1, 3, 16, 19, 23, and 38; C.I. Pigment Blues 1, 2, 15, 16, 22, and 60.

The colored resin prepared as above may be contained in the ink in an amount ranging preferably from 0.5% to 20% by weight based on the weight of the ink, but is not limited thereto provided that the aforementioned effects of the present invention can be achieved.

As the coloring material in the ink of the present invention, the above water dispersible particulate colored resin may be used singly, but another coloring material may be added to the ink for adjusting the color tone or other purposes, provided that the addition thereof does not hinder the achievement of the object of the present invention.

The content of the colorant in the film forming particulate colored resin ranges preferably from 1% to 50% by weight based on the weight of the particulate colored resin in view of the dispersion stability of the resin particles and the density of the printed image, but is not limited thereto provided that the effect of the present invention can be achieved.

The ink of the present invention has a constitution that the water-dispersible film-forming colored resin as prepared in the above-mentioned manner is dispersed in an aqueous liquid medium. The liquid medium may preferably be a mixed medium composed of water and a water-soluble organic solvent. Usual water-soluble organic solvents may be used for that purpose without a problem. The organic solvent includes, for example, polyalkylene glycols such as polyethylene glycol, and polypropylene glycol; alkylene glycols having an alkylene of 2–6 carbons such as ethylene glycol, propylene glycol, butylene glycol, triethylene glycol, 1,2,6-hexanetriol, hexylene glycol, diethylene glycol, and thiodiglycol; glycerol; lower alkyl ethers of polyhydric alcohol such as ethylene glycol methyl ether, diethylene glycol monomethyl (or monoethyl) ether, triethylene glycol monomethyl (or monoethyl) ether; alcohols such as methyl alcohol, ethyl alcohol, n-propyl alcohol, isopropyl alcohol, n-butyl alcohol, s-butyl alcohol, t-butyl alcohol, isobutyl alcohol, benzyl alcohol, and cyclohexanol; amides such as dimethylformamide, and dimethylacetamide; ketone and ketone alcohols such as acetone, and diacetone alcohol; ethers such as tetrahydrofuran, and dioxane; and nitrogen-containing heterocyclic ketones such as N-methyl-2-pyrrolidone, 2-pyrrolidone, and 1,3-dimethyl-2-imidazolidinone.

Of these, preferred water-soluble organic solvents are ethylene glycol, triethylene glycol, hexylene glycol, diethylene glycol, glycerol, thiodiglycol, ethyl alcohol, isopropyl alcohol, cyclohexanol, and so forth. The content of the water-soluble organic solvent may preferably range from 1% to 35% by weight based on the total weight of the ink.

The main constituents of the ink of the present invention are as mentioned above. The ink may contain an additive such as a moisture-retaining agent, a dispersant, a surfactant, a viscosity controller, surface tension adjusting agent, a fluorescent whitener, an antioxidant, a fungicide, a pH controller, and a UV absorber, if necessary, within amounts thereof not hindering the achievement of the object of the present invention.

As described above, the present invention provides an ink which improves the water resistance and ozone resistance of recorded images which are deficient with the conventional aqueous ink employing a water-soluble dye as the colorant, and which improves the ink fixability, and color of the recorded image. In particular, the present invention provides an ink which is widely used as a recording liquid for a recording apparatus like an ink-jet recording apparatus and which forms recorded images having satisfactory ozone resistance, excellent color and excellent image transparency.

EXAMPLES

The present invention is described below in more specifically by reference to Examples and Comparative Examples without limiting the invention in any way. In the Examples the unit "parts" is based on weight unless otherwise mentioned.

Example 1

In 100 parts of an aqueous dispersion (solid matter content: 20 wt %) of fine particulate resin (trade name; Movinyl 9000, acrylic resin emulsion, MFT: 30° C.) was dispersed 4 parts of Disperse Red 92. The liquid dispersion was heated up to about 100° C. to allow Disperse Red 92 to sublime and penetrate into the resin so that the colorant was incorporated in a monomolecular state into the interior of the resin. An aqueous dispersion of the colored resin was thus obtained.

To 25 parts of the resulting aqueous dispersion (20 wt %) were added 10 parts of glycerol, 5 parts of urea and 5 parts of isopropyl alcohol. Water was added to the mixture to make the total amount to be 100 parts. The mixture was stirred and filtered to prepare an ink-jet ink of this example.

Example 2

In 100 parts of an aqueous dispersion (solid matter content: 20 wt %) of fine particulate resin (trade name: Movinyl 886, acryl-styrene copolymer resin emulsion, MFT: 5° C.) was dispersed 4 parts of Disperse Yellow 54.

The liquid dispersion was heated to obtain an aqueous dispersion of the colored resin.

An ink of this Example was prepared with the above aqueous dispersion in the same manner as in Example 1.

Example 3

In 100 parts of an aqueous dispersion (solid matter content: 20 wt %) of fine particulate resin (trade name: Movinyl 620, acrylic resin emulsion, MFT<0° C.), was dispersed 4 parts of Solvent Blue 105. The liquid dispersion was heated to obtain an aqueous dispersion of the colored resin.

An ink of this Example was prepared with the above aqueous dispersion in the same manner as in Example 1.

Comparative Example 1

In 100 parts of an aqueous dispersion (solid matter content: 20 wt %) of fine particulate resin (trade name: Movinyl 970, acryl-styrene copolymer resin, MFT: 90° C.) was dispersed 4 parts of Disperse Red 92. The liquid dispersion was heated to obtain an aqueous dispersion of the colored resin.

An ink of this Comparative Example was prepared with the above aqueous dispersion in the same manner as in Example 1.

Example 4

In 80 parts of benzene was dissolved 20 parts of C.I. Disperse Red 73 (red disperse dye) to obtain a dye solution. To this dye solution 5 parts of polyethylene glycol distearate was added, and then, 232 parts of an aqueous dispersion (solid matter content: 43%) of acrylic copolymer (Movinyl, Hoechst Synthesis Co., MFT: 30° C.) was added dropwise with stirring at 60° C. to obtain a colored resin solution. From this colored resin solution, benzene was distilled out by azeotropic distillation. The eluted dye was eliminated by filtration. An aqueous solution was thus obtained in which particles of the colored resin are dispersed.

With the above aqueous colored resin dispersion, an ink was prepared which has the composition shown below.

| | |
|---|---|
| Aqueous colored resin dispersion | 10 parts |
| Glycerol | 10 parts |
| Diethylene glycol | 5 parts |
| Urea | 5 parts |
| Isopropyl alcohol | 3 parts |
| Water | Balance (total 100 parts) |

Example 5

An ink of Example 5 was prepared in the same-manner as in Example 1 except that a disperse dye, C.I. Disperse Red 104, was used as the colorant.

Comparative Example 2

An ink was prepared which had the composition below using an aqueous water-soluble red dye, C.I. Acid Red 289.

| | |
|---|---|
| C.I. Acid Red 289 | 1 part |
| Glycerol | 10 parts |
| Diethylene glycol | 5 parts |
| Urea | 5 parts |
| Isopropyl alcohol | 3 parts |
| Water | Balance (total 100 parts) |

[Evaluation of Ink Composition]

The above inks of Examples 1 to 5 and Comparative Examples 1 and 2 were used for ink-jet printing by means of a Bubble Jet Printer BJC-430 (Canon K.K.). The printed images were evaluated in accordance with the method and evaluation standard below.

(Image Transparency)

Solid images were printed in a patch pattern on an OHP sheet (trade name: Color BJ Transparency CF-301, Canon K.K.). The haze value of the printed area was measured by a haze meter (trade name: Direct-Reading Haze Meter, Toyo Seiki K.K.). The image transparency was evaluated according the standard below.

Haze value: $H=(Td/Tt)\times100(\%)$ where Tt (total light transmittance)=$(T_2/T_1)\times100(\%)$, Td (diffuse transmittance)=$(T_4-T_3(T_2/T_1))\times100(\%)$, $T_1$: total incident light quantity, $T_2$: total transmitted light quantity, $T_3$: quantity of light diffused by the apparatus, $T_4$: quantity of light diffused by the apparatus and the sample.

Evaluation Standard:

A: Haze value of less than 10,

B: Haze value of not less than 10 but less than 20

C: Haze value of not less than 20

(Ozone Resistance)

Printing was conducted on an ink-jet coat paper sheet (trade name: high-quality specialized paper HR-101, Canon K.K.). The printed matter was subjected to an ozone test by an ozone fade meter in a 3-ppm ozone atmosphere for two hours. The optical density (OD) of the image was measured before and after the ozone test, and the remaining optical density ratio (OD ratio) was determined by using the following formula:

Remaining OD ratio=(OD after ozone test)/(OD before ozone test)×100(%)

The ozone resistance was evaluated by the remaining OD ratio in accordance with the evaluation standard below:

A: not less than 80%

B: not less than 70% but less than 80%

C: less than 70%

(Rub Resistance)

Printing was conducted on a plain paper sheet (PB Paper, Canon K.K.). Two hours after the printing, the printed image was marked with a marking fluorescent ink felt pen. The occurrence of feathering was examined visually, and the evaluation was made in accordance with the standard below:

A: No feathering of printed image occurs.

B: Feathering occurs and printed image becomes stained.

(Water Resistance)

Printing was conducted on a plain paper sheet (PB Paper, Canon K.K.). Two hours after the printing, 1.5 mL of tapped water was put onto the printed matter kept tilted at a tilting angle of 45°. The occurrence of bleeding was examined and the evaluation was conducted in accordance with the standards below:

A: No bleeding of the print occurs.

B: Bleeding occurs, and ink runs.

TABLE 1

Results of the evaluation

| | Transparency | Ozone resistance | Rub resistance | Water resistance |
|---|---|---|---|---|
| Examples | | | | |
| 1 | A | B | A | A |
| 2 | A | A | A | A |
| 3 | A | A | A | A |
| 4 | A | A | A | A |
| 5 | A | A | A | A |
| Comparative Examples | | | | |
| 1 | B | C | B | B |
| 2 | A | A | B | B |

What is claimed is:

1. An ink-jet recording method comprising a step of ejecting an aqueous ink through an orifice in correspondence with a recording signal to deposit the ejected ink onto a recording medium, wherein:

the ink comprises glycerol or ethylene glycol, and a colored resin particle dispersed in an aqueous medium, the colored resin particle comprises an acrylic film-forming resin to which at least one of an oil soluble dye and a disperse dye is sublimed and penetrated, and the film-forming resin has a minimum film-forming temperature (MFT) of not higher than 35° C.

* * * * *

UNITED STATES PATENT AND TRADEMARK OFFICE
CERTIFICATE OF CORRECTION

PATENT NO.    : 6,780,901 B1
DATED         : August 24, 2004
INVENTOR(S)   : Makiko Endo et al.

It is certified that error appears in the above-identified patent and that said Letters Patent is hereby corrected as shown below:

Title page,
Item [56], References Cited, FOREIGN PATENT DOCUMENTS,
"JP     55139471 A  *  10/1980" should be deleted.
"11228655" should read -- 11-228655 --.
OTHER PUBLICATIONS, "55139471" should read -- 55-139471 --.

Column 3,
Line 9, "the" should be deleted.

Column 6,
Line 4, "monomer may" should read -- monomers may be --.

Column 12,
Line 13, "oil soluble" should read -- oil-soluble --.

Signed and Sealed this

Fourteenth Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,780,901 B1
DATED : August 24, 2004
INVENTOR(S) : Makiko Endo et al.

It is certified that error appears in the above-identified patent and that said Letters Patent is hereby corrected as shown below:

Title page,
Item [75], Inventors, "Murayama (JP);" should read -- Higashi Murayama (JP); --.

Signed and Sealed this

First Day of February, 2005

JON W. DUDAS
*Director of the United States Patent and Trademark Office*